(12) United States Patent  
Chen

(10) Patent No.: US 7,496,068 B2
(45) Date of Patent: Feb. 24, 2009

(54) METHODS AND APPARATUS FOR DATA TRANSFER IN A PACKET-SWITCHED DATA NETWORK

(76) Inventor: Xiaobao Chen, 17 Beech Drive, Swindon SN5 5DQ (GB)

( * ) Notice: Subject to any disclaimer, the term of this patent is extended or adjusted under 35 U.S.C. 154(b) by 617 days.

(21) Appl. No.: 11/089,543

(22) Filed: Mar. 23, 2005

(65) Prior Publication Data

US 2005/0265363 A1 Dec. 1, 2005

(51) Int. Cl.
*H04L 12/56* (2006.01)

(52) U.S. Cl. ........................ 370/329; 370/392; 370/400; 455/432.1

(58) Field of Classification Search ........................ None
See application file for complete search history.

(56) References Cited

U.S. PATENT DOCUMENTS

| | | | |
|---|---|---|---|
| 6,466,985 B1 * | 10/2002 | Goyal et al. | 709/238 |
| 7,330,448 B2 * | 2/2008 | Verma et al. | 370/331 |
| 2001/0028647 A1 * | 10/2001 | Teraoka | 370/389 |
| 2003/0172160 A9 * | 9/2003 | Widegren et al. | 709/226 |
| 2004/0151155 A1 * | 8/2004 | Jouppi | 370/349 |
| 2004/0153551 A1 * | 8/2004 | Haumont | 709/228 |

OTHER PUBLICATIONS

Perkins, C., IP Mobility Support, IETF Request for Comment (RFC) 2002, http://www.ietf.org/rfc/rfc2002/txt?number=2002, Oct. 1996, 74 pgs.
Johnson, et al., Mobility Support in IPv6 <draft-ietf-mobileip-ipv6-18.txt>, IETF Internet Draft, http://www.ietf.org/proceedings/02jul/I-D/draft-ietf-mobileip-ipv6-18.txt, Jun. 2002, 160 pgs.
Conta, A., Generic Packet Tunneling in IPv6—Specification, IETF Request for Comment (RFC) 2473, http://www.ietf.org/rfc/rfc2473.txt?number=2473, Dec. 1998, 34 pgs.
3rd Generation Partnership Project, Technical Specification Group Services and System Aspects, General Packet Radio Service (GPRS), Service Description, Stage 2 (Release 1999), 3GPP TS 23.060 v3.12.0 (2002-06) Technical Specification, http://www.3gpp.org/ftp/specs/2002-06/R1999/23_series/192 pgs.
3rd Generation Partnership Project, Technical Specification Group Services and Systems Aspects, Architectural Requirements for Release 1999 (Release 1999), 3GPP TS 23.121 v3.6.0 (2002-06) Technical Specification, http://www.3gpp.org/ftp/specs/2002-06/R1999/23_series/, 57 pgs.
Deering, et al., Internet Protocol, Version 6 (IPv6) Specification, Request for Comment (RFC) 2460, http://www.ietf.org/rfc/rfc2460.txt?number=2460, Dec. 1998, 37 pgs.

* cited by examiner

*Primary Examiner*—Wing F Chan
*Assistant Examiner*—Brian Roberts
(74) *Attorney, Agent, or Firm*—Knobbe, Martens Olson & Bear LLP

(57) ABSTRACT

Apparatus for and methods of enabling a gateway node of a first packet-switched data network to select a first channel for transferring a data packet to a destination packet data protocol address of a correspondent node provided service in the first network are disclosed. The gateway node is configured to select the first channel from a plurality of channels configured to transfer data packets to the destination packet data protocol address of the correspondent node, wherein the data packet is sent from a mobile node of a second packet-switched data network external to the first network, and wherein the mobile node has been in a communication session with the correspondent node while provided service in a third packet-switched data network different to the second network.

24 Claims, 9 Drawing Sheets

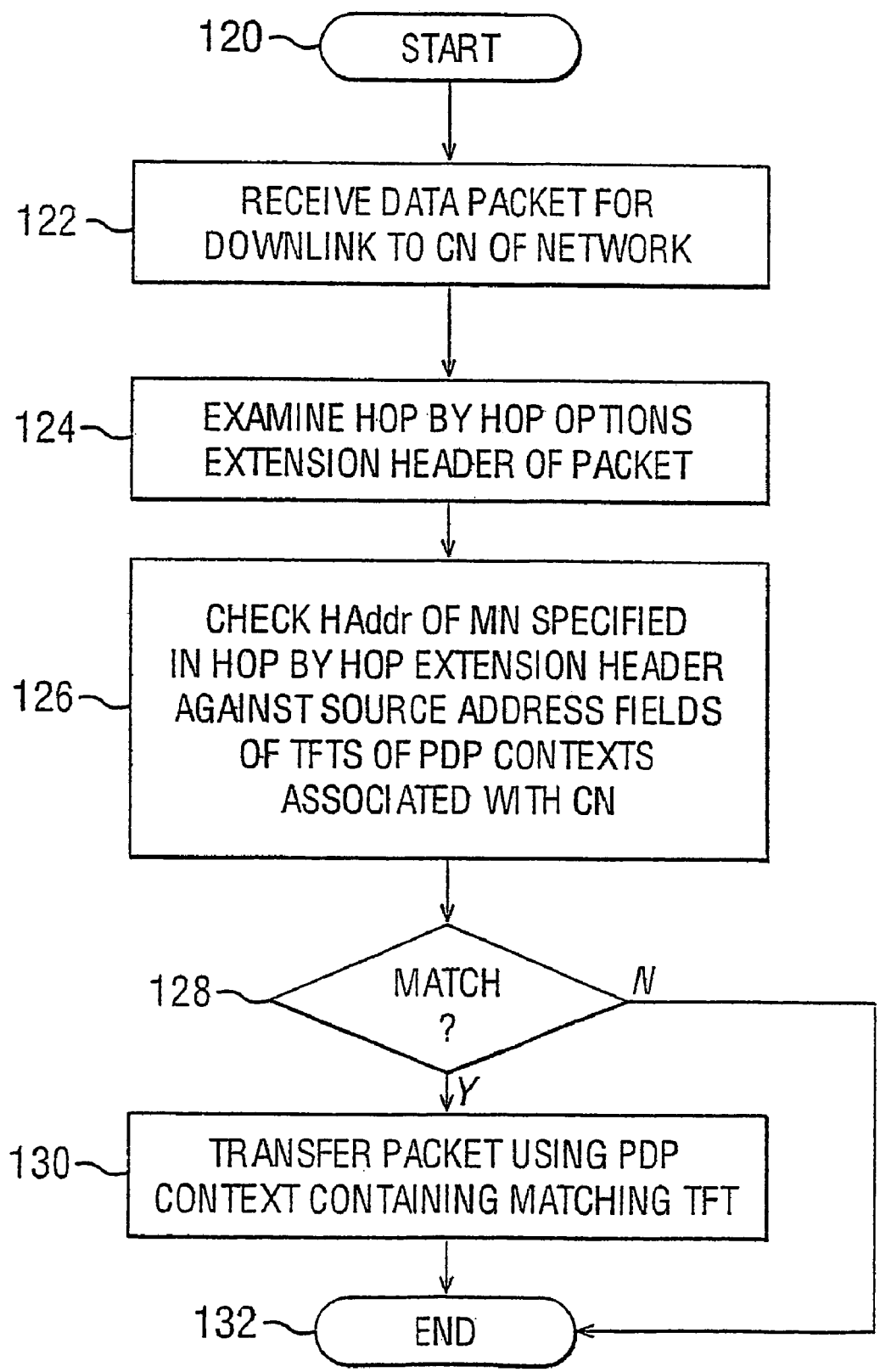

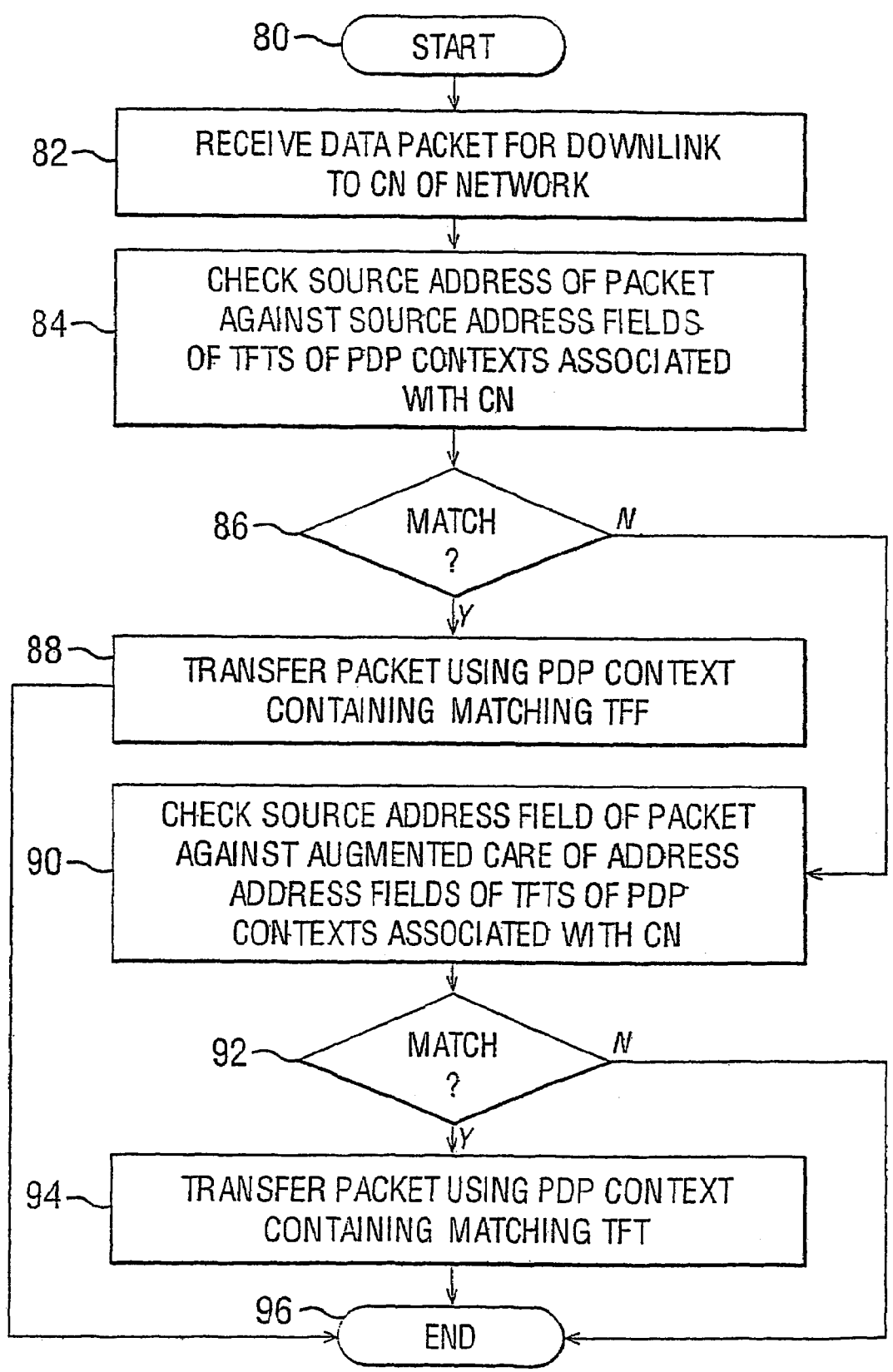

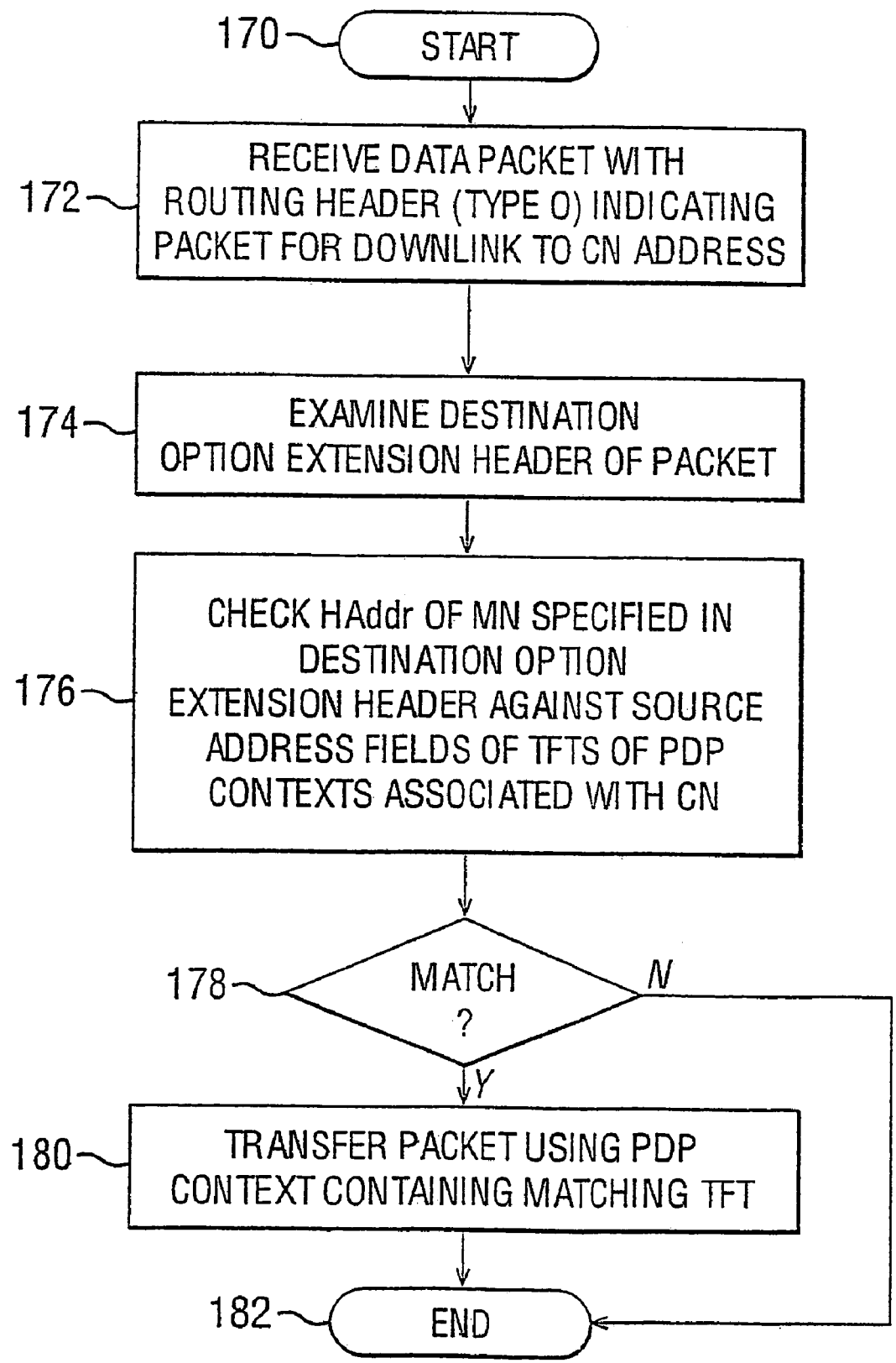

METHODS AND APPARATUS FOR DATA TRANSFER IN A PACKET-SWITCHED DATA NETWORK

CROSS REFERENCE TO RELATED APPLICATION

This application claims priority under 35 U.S.C. § 120 to PCT International Application No. PCT/GB03/004160, filed on Sep. 24, 2003 and published in the English language, which claims priority under 35 U.S.C. § 119 to United Kingdom Patent Application No. 0222161.2 filed on Sep. 24, 2002 and United Kingdom Patent Application No. 0230335.2 filed on Dec. 31, 2002. The disclosures of the above-described filed applications are hereby incorporated by reference in their entirety.

FIELD OF THE INVENTION

The present invention relates to apparatus for and methods of transferring data in a packet-switched network.

BACKGROUND

Whereas conventional 2G mobile networks, such as those conforming to the Global System for Mobile Communications (GSM) standards, have provided circuit-switched voice and data services to user's mobile stations (MSs), there is great momentum in the mobile telecommunications industry to deploy packet-switched mobile networks. Packet-switched mobile networks have significant advantages in terms of network and radio resource efficiency and also enable the provision of more advanced user services. With the convergence of fixed and mobile telecommunications networks, the Internet Protocol (IP), widespread in fixed networks, is the natural choice as the packet routing mechanism for mobile packet networks. Currently IP version 4 (IPv4) is in widespread use in the fixed network domain. However, it is expected gradually to migrate to IP version 6 (IPv6) which offers well-recognised benefits over IPv4, notably in terms of greatly increased address space, more efficient routing, greater scalability, improved security, Quality of Service (QoS) integration, support for multicasting and other features.

Particular examples of mobile packet-switched services currently being deployed include the General Packet Radio Service (GPRS) as implemented in both 2G GSM networks and in 3G Universal Mobile Telecommunications System (UMTS) networks (hereinafter referred to as GPRS networks). It is also expected that non-GPRS wireless access technologies, such as wireless Local Area Network (wLAN), will provide a flexible and cost-effective complement to GPRS for local broadband service access in some areas such as hotspots (conference centres, airports, exhibition centres, etc). Consequently mobile network operators will want to support roaming of mobile stations between GPRS and non-GPRS networks or subnetworks.

While GPRS networks, having been designed from the start as mobile networks, have built-in mobility management (for MSs within the GPRS network) and roaming functionality (for MSs roaming between GPRS networks), work has also taken place in the Internet Engineering Task Force (IETF) to support mobility of IP user terminals in general. To this end, the IETF have developed the Mobile IP (MIP) protocols. MIP is designed to support mobility when mobile stations (or mobile nodes (MNs) in MIP terminology) move between IP networks with different subnet prefixes (macro-mobility). For example, MIP may be used to support mobility between a GPRS network and a non-GPRS network such as a wLAN network. Mobile IP is not expected to be used for mobility management within a network or subnetwork (micro-mobility) which is typically managed by access technology specific layer 2 mechanisms such as WCDMA softer/soft handover.

There are two versions of MIP to correspond to the two versions of IP. MIP version 4 (IPv4) is designed to provide IP address mobility for IP version 4 (IPv4) addresses, whereas the newer MIP version 6 (MIPv6) MIP is designed to provide IP address mobility for IP version 6 (IPv6) addresses. MIPv4 is described in the IETF Request For Comment (RFC) 2002 available at the EETF website http://www.ietf.org/rfc/rfc2002.txt?number=2002. Internet draft MIPv6 is described in the IETF Internet draft "Mobility Support in IPv6" available at the IETF website at http://search.ietf.org/internet-drafts/draft-ietf-mobileip-ipv6-18.txt and referenced as draft-ietf-mobileip-ipv6-18.txt.

MIPv4 mobility management is illustrated in FIG. 1. A MN 40 is allocated a home IP address (HAddr) in its Home Network (HN) 42. Routing procedures in the HN ensure that wherever the MN is within the HN, an IP packet sent from a Correspondent Node (CN) 46 will reach the MN. However, when the MN roams to a foreign network (FN) 44, IP packets addressed to its HAddr will need to be routed to its new location in the FN. In MIPv4, a router 48 in the HN known as the Home Agent (HA) is used to act as a packet forwarding service on behalf of the MN when it is away from home. In a first working mode of MIPv4 (known as FA-CoA mode), when arriving in the FN, the MN is allocated a Care of Address (CoA) by a router 50 in the FN known as the Foreign Agent (FA). Due to perceived limitations of IPv4 address space, it is envisaged that more than one MN may share the same CoA. After allocation of the CoA, the FA 50 sends a binding update to the HA to register the CoA. Thereafter, when the CN sends a packet to the HAddr of the MN in its HN (case 1), the packet is intercepted by the HA and tunnelled to the FA in the FN via tunnel 52 on the basis of the CoA.

Tunnelling involves encapsulating a first data packet (with a header and a payload) as the payload of a second data packet having a new header indicating, as its source and destination addresses, the start and end points of the tunnel, and transferring the second data packet as normal to the tunnel endpoint where it is decapsulated to obtain the first packet. After decapsulation, the tunnel end point, the FA, routes the original packet to the MN using routing procedures in the FN. In MIP, tunnelling involves IP in IP encapsulation using the IETF Request For Comment (RFC) 2003. Thus in MIPv4, an IPv4 packet is tunnelled by encapsulating it within another IPv4 packet.

As an optional procedure in MIPv4, the MN may then send a binding update to the CN to register its CoA. Thereafter, the CN may address packets directly to the MN at its current CoA, rather than indirectly via its HAddr (case 2), and these packets are received by the FA in the FN and routed to the MN using routing procedures in the FN. This is known as route optimisation since it avoids potentially inefficient triangular routing via the HA which in general will not be on an efficient routing path between the CN and the FA.

In a second optional working mode of MIPv4 (known as CoCoA mode) there is no sharing of CoAs by MNs away from their home network and no FA is used. The MN is allocated a unique CoA, known as a co-located CoA (Co-CoA), using standard dynamic IP address allocation procedures—eg using Dynamic Host Control Protocol (DHCP). In this working mode, the MN must itself send a binding update to its HA to register its newly allocated CoCoA. Thereafter, packets sent by a CN and addressed to the MN at its HAddr are tunnelled from the HA directly to the MN. As with FA-CoA mode, as an optional procedure in CoCoA mode, the MN may also send a binding update to a CN to register its CoCoA. Thereafter, packets may be sent by the CN directly to the MN at its CoCoA.

MIPv6 mobility management is illustrated in FIG. 2. Two notable differences of MIPv6 over MIPv4 are as follows. Firstly, due to the greatly increased address space in IPv6, CoAs allocated to a MN in a FN are never shared (ie they correspond to the optional CoCoA in MIPv4). Secondly, as a result, there is no need to deploy a FA in the FN. Referring to FIG. 2, with MIPv6, when a MN 40 moves from its HN 42 to a FN 44, it is allocated a unique CoA and sends a binding update to its HA 48 in its HN to register the CoA. Packets from a CN 46 addressed to the HAddr are intercepted by the HA 48 (case 1) and tunnelled to the CoA via tunnel 54. This tunnelling may be achieved using IPv6 Generic Packet Tunnelling Mechanism described in IETF RFC 2473. However, in MIPv6, route optimisation is not an option but a fundamental part of the protocol and, in general, the MN should send a binding update to the CN so that it may address packets directly to the MN at its CoA (case 2). When an MN receives a packet tunnelled from a CN via the MN's HA, it may take this as an indication that the CN has no binding for the MN and initiate a CN binding update. Note that in MIPv6 the CN binding update must use the new CoA of the MN as the source address in the IPv6 header (see Clause 11.6.2 of the MIPv6 IETF Internet draft).

The 3rd Generation Partnership Project (3GPP) responsible for the GPRS standards has recognised that MIP may need to be supported in GPRS networks. Technical Specification 23.060 Clause 5.7 states that "To support the optional Mobile IP services, see 3G TS 23.121, efficiently in the packet domain, Foreign Agent (FA) functionality needs to be provided in the GGSN. The interface between the GGSN and FA, including the mapping between the care of IP address and the GTP tunnel in the PLMN is assumed not to be standardized as the GGSN and FA are considered to be one integrated node." Furthermore, 3G TS 23.121 (available from the 3GPP website at http://www.3gpp.org/ftp/specs/2002-06/R1999/23_series/) states that " . . . it is important to offer Mobile IP also to UMTS and GPRS users to allow them to roam to and from other access technologies while keeping ongoing data sessions, e.g. TCP or UDP" and that "as IP addresses in IPv4 are scarce, it has to be assumed that Mobile IPv4 preferably will be used with the Foreign Agent (FA) care-of addresses. Compared to using co-located care-of addresses, FA care-of addresses does not only conserve IP addresses, it is also more efficient over the radio interface."

However, there may be circumstances in which the above assumptions are false. Firstly, a GPRS network operator may want to use CoCoAs in MUPv4 instead of FA CoAs. For instance, IPv4 addresses may not be scarce within a particular GPRS network and CoCoAs may be preferred to improve scalability and routing efficiency. Secondly, there may be circumstances in which the GPRS network operator would not want to integrate FA functionality in the Gateway GPRS Support Node (GGSN) which is the gateway connecting the GPRS network to external packet-switched networks. For instance, the GGSN may be heavily loaded and separating the GGSN and FA functionality would improve load balancing. Furthermore, it may be considered beneficial to locate the FA in nodes which are closer to the edges of the GPRS network, such as access nodes, for improved scalability. Thirdly, the 3GPP has itself recently mandated that IPv6 must be supported in UMTS R5 IP Multimedia System (IMS) and IP radio access networks in general. Thus, it is clear that GPRS networks will need to support MIPv6 as well as MUPv4 in future and, as described above, MIPv6 has no FA and uses CoAs which are unique to the MN (ie always "co-located").

The present inventors have realised that a problem arises in GPRS networks implemented according to the present service descriptions (Release 1999) in each of the three circumstances listed above. One particular feature of GPRS networks, which conform to Release 1999 of the GPRS Service Description, is support for what are known as packet data protocol (PDP) contexts. Specifying different PDP contexts are useful for a variety of reasons. In particular, PDP contexts allow differing QoS levels and other parameters to be specified for traffic to and from a single PDP address of a MS. This allows efficient transfer of a variety of data traffic, such as non real-time traffic (eg intermittent and bursty data transfers, occasional transfers of large volumes of data) and real-time traffic (eg voice, video). For example, a MS in a GPRS network, having a PDP address, such as an IPv4 or IPv6 address, may communicate with a plurality of other telecommunications devices in external packet-switched networks using different PDP contexts with differing QoS parameters for each one. It is generally the duty of the MS to create and modify PDP contexts as required.

Incoming data packets from an external network for downlink to a MS are received in the GPRS network by the GGSN. If the PDP address of the MS has multiple PDP contexts established, it is essential that the GGSN be able to determine the appropriate PDP context for each packet, so that it may be transferred appropriately to the MS. This is achieved by using Traffic Flow Templates (TFTs) associated with PDP contexts. The TFTs may contain packet filtering information used by the GGSN to determine the appropriate PDP context for downlink data packets. According to current 3GPP standards, one specified item of information for use in packet filtering is the source address of the incoming data packet—eg the IP address of the source node as specified in the IP packet header. When an incoming data packet arrives at the GGSN, its source address is checked against existing TFTs associated with the PDP address of the MS. If a match is found, the packet is transferred to the MS at its PDP address according to the appropriate PDP context. If, however, no match is found, the packet may be dropped by the GGSN. Here is where the problem arises.

Let us suppose that the telecommunications device in communication with the MS is itself a mobile device and is provided macro-mobility using either MIPv4 or MIPv6. Let us also suppose that it has just moved to a new FN and has been allocated a new CoA (or possibly CoCoA) for use in that FN. Let us now call the MS in the GPRS network a CN and the telecommunications device in the external network a MN for consistency. The CN may already have a PDP context established for the communication session with the MN using the MN's HAddr as a source address in the TFT packet filtering information. However, after moving to the new FN, any data packets now sent from the MN to the CN will have the new CoA (or CoCoA) as their source address in the IPv4 or IPv6 header. Thus, an incoming data packet arriving at the GGSN in the GPRS network will not be recognised by the GGSN using the TFT identifying the MN's HAddr as the source address and may be dropped.

This problem applies not only to user data packets sent by the MN to the CN, but also to signalling data packets such as a correspondent binding update packet that the MN's HA may (MIPv4) or MN should (MIPv6) send to the CN. The MN correspondent binding update will also use the new CoA/CoCoA as the source address (see Clause 11.6.2 of the MIPv6

IETF Internet draft) and this will not be recognised by the GGSN. Thus, the CN in the GPRS network is caught in a circular trap in that it cannot receive a correspondent binding update from the MN, because it has not received the MN's new CoA/CoCoA. But it cannot receive the MN's new CoA/CoCoA, because it has not received a correspondent binding update—"Catch 22".

The present invention provides a solution to the above problem.

SUMMARY OF CERTAIN INVENTIVE EMBODIMENTS

The present invention relates to enabling a gateway node of a first packet-switched data network to select a first channel for transferring a data packet to a destination packet data protocol address of a correspondent node provided service in the first network, the gateway node being arranged to select the first channel from a plurality of channels each being for transferring data packets to the destination packet data protocol address of the correspondent node, the data packet having been sent from a mobile node of a second packet-switched data network external to the first network, the mobile node having been in a communication session with the correspondent node while provided service in a third packet-switched data network different to the second network.

More particularly, but not exclusively, the present invention relates to apparatus for and methods of enabling a General Packet Radio Service Gateway Support Node (GGSN) of a 2G or 3G General Packet Radio Service (GPRS) network to select an appropriate Packet Data Protocol (PDP) Context for transferring a data packet, sent by a Mobile Node (MN) in an external IP network, to a Correspondent Node (CN) in the GPRS network, where macro-mobility of the MN is supported using the Mobile Internet Protocol, the MN is away from its Home Network (HN), and where the data packet uses the Care Of Address (CoA, CoCoA) of the MN as its source address.

According to a first aspect of the present invention, there is provided a method of enabling a gateway node of a first packet-switched data network to select a first channel for transferring a data packet to a destination packet data protocol address of a correspondent node provided service in the first network, the gateway node being arranged to select the first channel from a plurality of channels each being for transferring data packets to the destination packet data protocol address of the correspondent node, the data packet having been sent from a mobile node of a second packet-switched data network external to the first network, the mobile node having been in a communication session with the correspondent node while provided service in a third packet-switched data network different to the second network, the method comprising:

a) the mobile node associating, with the data packet, a first packet data protocol address which it used in the communication session with the correspondent node;

b) the gateway node selecting the first channel by matching the first packet data protocol address associated with the data packet received by the gateway node to a first data packet filter associated with the first channel.

Further aspects of the present invention include a mobile node and a gateway node arranged in accordance with the method of the first aspect described above.

According to a second aspect of the present invention there is provided a method of enabling a gateway node of a first packet-switched data network to select a first channel for transferring a data packet to a destination packet data protocol address of a correspondent node provided service in the first network, the gateway node being arranged to select the first channel from a plurality of channels each being for transferring data packets to the destination packet data protocol address of the correspondent node, the data packet having been sent from a mobile node of a second packet-switched data network external to the first network, the mobile node having been in a communication session with the correspondent node while provided service in a third packet-switched data network different to the second network, wherein mobility of the mobile node between networks or subnetworks is supported using the Mobile Internet Protocol (MIP) standards, the mobile node having a home packet data protocol address (HAddr) in the third network, the mobile node having moved to the second network and having been provided with a current packet data protocol address (CoA, CoCoA) in the second network, the method comprising:

a) the mobile node sending a MIP correspondent binding update packet addressed to the correspondent node, the MIP correspondent binding update packet having the home packet data protocol address of the mobile node associated with it;

b) the gateway node receiving the correspondent binding update packet and transferring it to the correspondent node using a second channel having no associated data packet filters;

c) the correspondent node matching the home packet data protocol address of The mobile node associated with the correspondent binding update packet to the communication session with the mobile node; and d) in response to the matching, the correspondent node arranging for the current packet data protocol address of the mobile node to be included in the first data packet filter.

Further aspects of the present invention include a correspondent node arranged in accordance with the method of the second aspect described above.

Further aspects of the present invention are set out in the accompanying claims.

There now follows, by way of example only, a detailed description of preferred embodiments of the present invention in which:

BRIEF DESCRIPTION OF THE DRAWINGS

FIG. 5 is a flow diagram showing the modified procedure followed by a GGSN of a GPRS network according to the first and second embodiments of the present invention;

FIG. 7 is a flow diagram showing the modified procedure followed by a GGSN of a GPRS network according to the second, third and fifth embodiments of the present invention;

FIG. 9 is a flow diagram showing the modified procedure followed by a GGSN of a GPRS network according to the fourth and fifth embodiments of the present invention.

DETAILED DESCRIPTION OF CERTAIN INVENTIVE EMBODIMENTS

Figure 1:
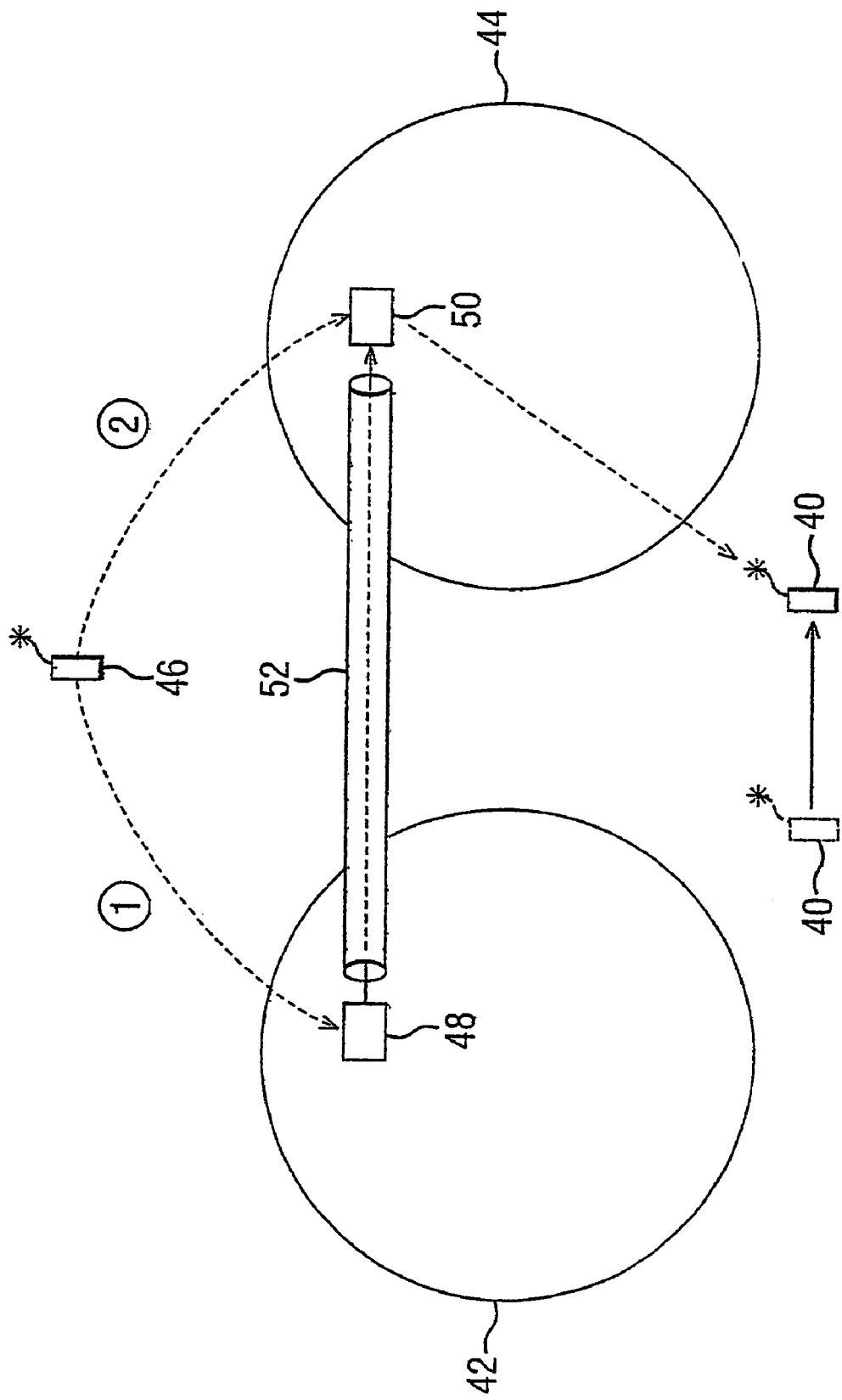
FIG. 1 is a conceptual diagram showing mobility management as provided in MIPv4.
Figure 2:
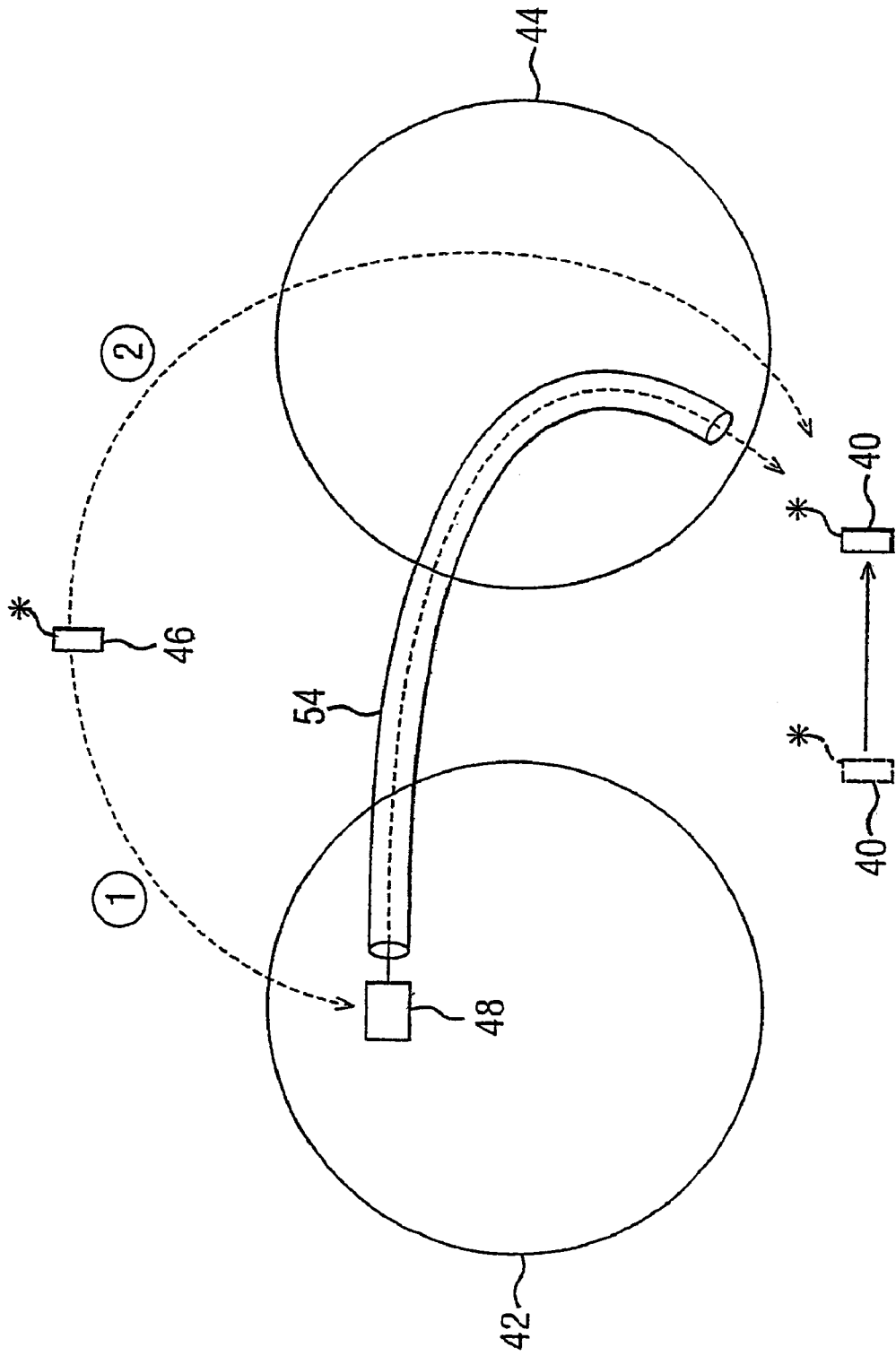
FIG. 2 is a conceptual diagram showing mobility management as provided in MIPv6.
Figure 3:
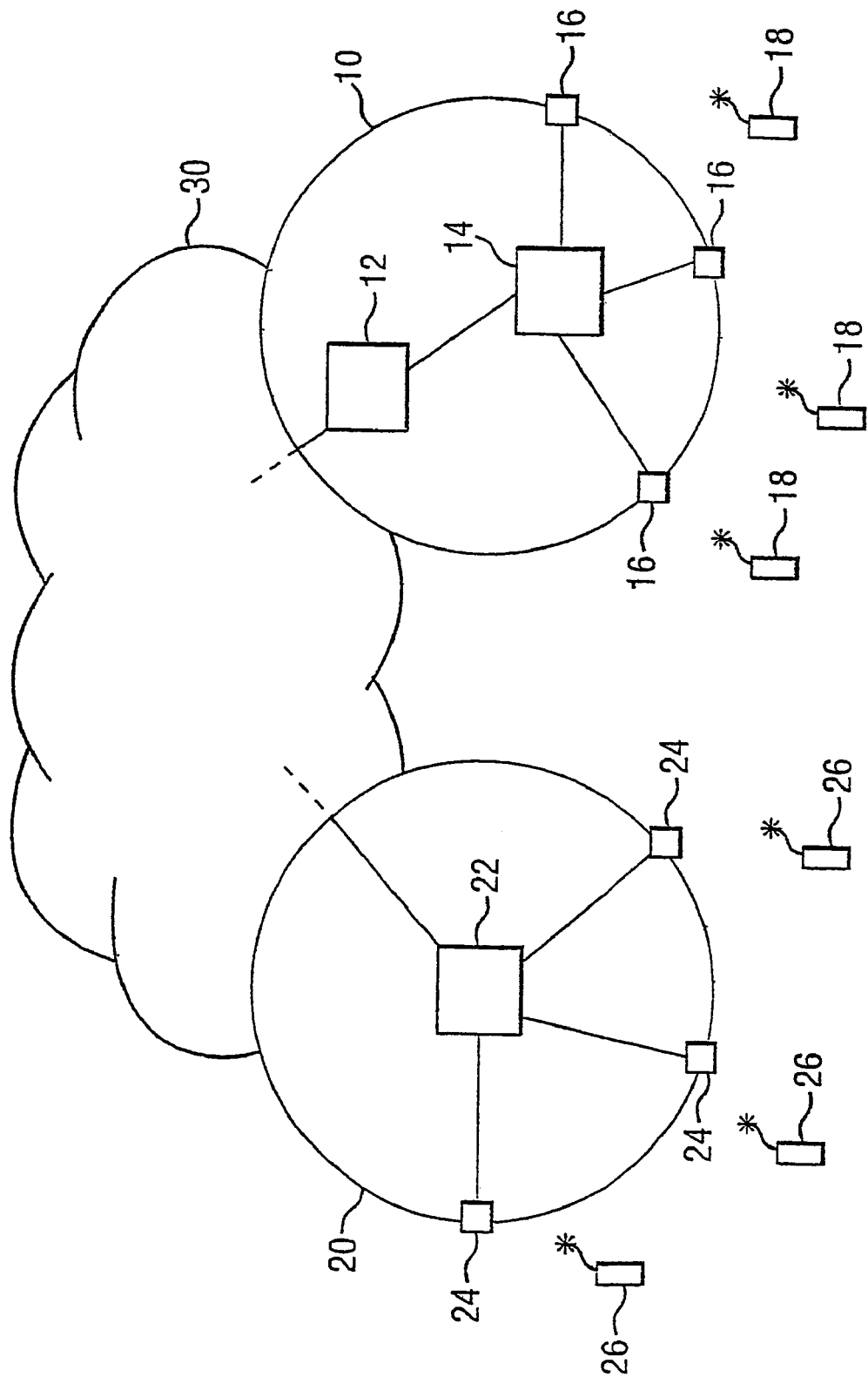
FIG. 3 is a network architectural diagram showing a GPRS network and a wLAN network connected via an external packet-switched network cloud.

FIG. 3 shows a network architecture in which both a GPRS network 10 and a wLAN network 20 are both connected with one or more external packet networks in external packet network cloud 30.

GPRS network 10 is connected to the external packet networks via one or more Gateway GPRS Support Nodes (GGSNs) (although here only one GGSN 12 is illustrated) which communicate with one or more Serving GPRS Support Nodes (SGSNs) (although here only one SGSN 14 is illustrated) via an internal IP-based packet-switched backbone network. SGSN 14 keeps track of the location of individual Mobile Stations (MSs) attached to the GPRS service and performs security functions and access control. SGSN 14 is itself connected to one or more Radio Access Networks (RANs) 16 (either the Base Station Subsystem (BSS) in the 2G GSM network or UMTS Terrestrial Radio Access Network (UTRAN) in the 3G UMTS network). The RNS's control communication over the air with one or more MSs 18.

Other major components of GPRS network 10, such as the Home Location Register (HLR) which stores GSM and UMTS subscription data and the Mobile Switching Centre-Nisitor Location Register (MSCNVLR) which handles circuit-switched services and also keeps track of the location of individual Mobile Stations (MSs), are omitted for clarity. The reader is referred to the GPRS Service Description (release 1999) Technical Specification, referred to as 3G TS 23.060 v3.12.0 (2002-06) and available from the 3GPP website at http://www.3gpp.org/ftp/specs/2002-06/R1999/23_series/, which provides a detailed service description for 2G (GPRS/GSM) and 3G (GPRS/UMTS) mobile packet networks. The functionality of GPRS networks is also generally well-known, although further aspects will be described in detail below.

WLAN network 20 is connected to the external packet networks via an Access Controller (AC) 22 which controls one or more Access Points 24 which communicate over the air with one or more MSs 26. The functionality of wLAN networks is generally well-known and will not be described in detail further herein.

In order to access GPRS packet-switched services, a MS first performs a GPRS attach procedure with the SGSN (either a 2G GSM GPRS attach or a 3G UMTS GPRS attach). Authentication and location updating procedures are performed, and, if successful, the GPRS attach procedure makes the MS available for paging via the SGSN and notification of incoming packet data. However, to actually send and receive packet data, the MS must have an allocated Packet Data Protocol (PDP) address (eg an IP address) and must activate at least one PDP context for use with that PDP address. Each PDP address for a MS may have one or more PDP contexts associated with it and data defining the PDP contexts is stored in the MS, the SGSN, and the GGSN. The process of PDP context activation makes the MS known not only to the SGSN, but also to the corresponding GGSN and inter-working with external data networks can commence.

PDP contexts are used to maintain state such as routing information and Quality of Service (QoS) requirements in nodes of the GPRS network. In particular, multiple PDP contexts allow one or more levels of QoS to be specified for a single PDP address of a MS to allow efficient transfer of a variety of data traffic, such as non real-time traffic (eg intermittent and bursty data transfers, occasional transfers of large volumes of data) and real-time traffic (eg voice, video). Thus an application running on a MS with a single PDP address may utilize one or more levels of QoS according to its needs by using one or more PDP contexts. A PDP context may be in one of two states—active or inactive. When inactive, a PDP context contains no routing or mapping information to process packets related to the PDP address. No data can be transferred. When active, the PDP context for the PDP address is activated in the MS, SGSN and GGSN. The PDP context contains mapping and routing information for transferring PDP packets for that particular PDP address between the MS and the GGSN.

User data is transferred between external networks and the MS using tunnelling. Between the SGSN and the MS, tunnelling procedures are used which differ between 2G GSM and 3G UMTS networks. However, between the GGSN and the SGSN, packets are tunnelled using a common encapsulation procedure according to the GPRS Tunnelling Protocol (GTP). The packet domain PLMN backbone network encapsulates a data packet with a GTP header, and inserts this GTP packet in a UDP packet that is again inserted in an IP packet. The IP and GTP packet headers contain the GSN addresses and tunnel endpoint identifier necessary to uniquely address a PDP context. Where there are multiple PDP contexts for a single PDP address of a MS, there must be a corresponding number of GTP tunnels established between the GGSN and the SGSN for packet data transfer. Note the GTP tunnels used in GPRS networks are not to be confused with MIP tunnels.

When multiple PDP contexts exist for a PDP address, the GGSN routes downlink packets to the different GTP tunnels based on what are called Traffic Flow Templates (TFTs) assigned to the PDP contexts. Each PDP context may be associated with a TFT. However, as a strict rule, at most one PDP context associated with the same PDP address may exist at any time with no TFT assigned to it. Thus, with n multiple PDP contexts there will always be either n TFTs or (n−1) TFTs each corresponding to individual ones of the n PDP contexts. Where there is an 1 to 1 mapping between TFTs and the GTP tunnels corresponding to each PDP context, selection of the GTP tunnel is straight forward on the basis of TFT. Where there is an (n−1) to n mapping, selection is also straight forward, but may involve a simple process of elimination if no match can be found for a TFT.

TFTs are also prioritised using evaluation precedence indices. Upon reception of a data packet, the GGSN evaluates for a match, first the packet filter amongst all TFTs that has the smallest evaluation precedence index and, in case no match is found, proceeds with the evaluation of packet filters in increasing order of their evaluation precedence index. This procedure is executed until a match is found, in which case the data packet is tunnelled to the SGSN via the GTP tunnel that is associated with the PDP context corresponding to the matching TFT packet filter. According to 3G TS 23.060 Clause 9.3, if no match is found, the data packet is tunnelled via the PDP context that does not have a TFT assigned to it, but if all PDP contexts have a TFT assigned, the GGSN must silently discard the data packet.

The TFTs contain attributes relating to the headers of downlink data packets which are used to filter the data packets and thus route or map them to the GTP tunnel for the correct PDP context. The attributes are defined in terms of IP header fields. According to 3G TS 23.060 Clause 15.3.2, the data packet header attributes contained in TFTs are specified in terms of both IPv4 and IPv6 header fields. Each TFT consists of between 1 and 8 packet filters, each identified by a unique packet filter identifier. A packet filter also has an evaluation precedence index that is unique within all TFTs associated with the PDP contexts that share the same PDP address. According to 3G TS 23.060 Clause 15.3.2, each valid packet filter contains a unique identifier within a given TFT, an evaluation precedence index that is unique within all TFTs for one PDP address, and at least one of the following IPv4 or IPv6 packet header attributes:

Source Address and Subnet Mask.
Protocol Number (IPv4) or Next Header (IPv6).
Destination Port Range.
Source Port Range.
IPSec Security Parameter Index (SPI).
Type of Service (TOS) (IPv4) or Traffic class (IPv6) and Mask.
Flow Label (IPv6).

However, not all of these may be used in combination without resulting in inconsistency. In practice, the Source Address and Subnet Mask will most commonly be used since in common use cases, a MS will establish a different PDP context for its (or one of its) PDP addresses for each different correspondent node PDP address. Note that the attribute list does not contain the Destination Address attribute, only Destination Port Range. This is because TFT packet filters are not used to map packets to one of a plurality of destination addresses, but to the GTP tunnel corresponding to one of a plurality of PDP contexts established for a single destination address at a single MS.

However, as discussed above, the Source Address attribute may not be sufficient for the GGSN to map incoming packets for downlink to the MS under certain circumstances. According to the present invention, where an MS is engaged in a communication session with a MIPv4 or MIPv6 enabled MN (we shall now call the GPRS MS a CN), the procedure followed by the MN, the GGSN, and in some embodiments the CN is modified.

First Embodiment

Figure 4A:
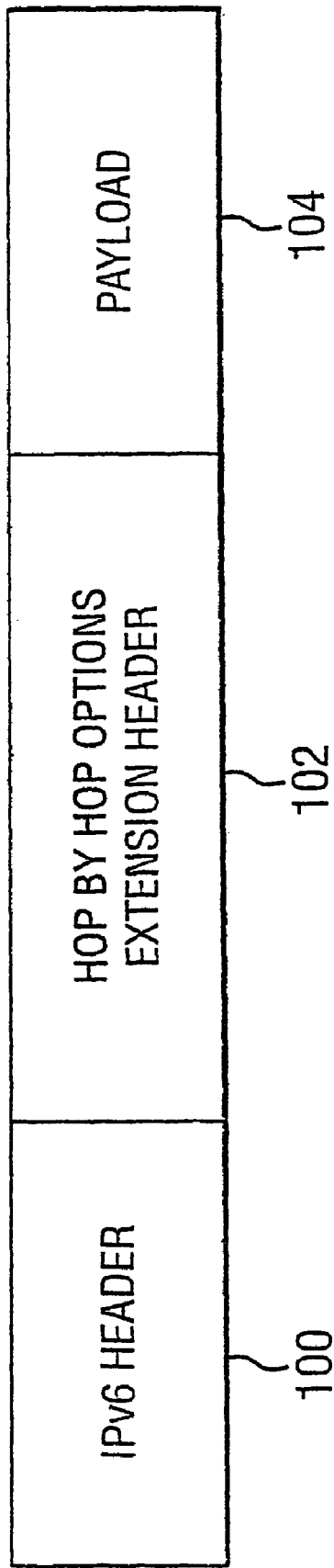
FIGS. 4A and 4B are block diagrams showing the modified structure of IPv6 data packets sent by a MN according to first and second embodiments of the present invention.

According to a first embodiment of the present invention, where the MN is IPv6 capable, the MN is modified to include its HAddr in a Hop-by-Hop Options extension header of the IPv6 packet for all data packets it sends to the CN, whenever it is away from home. This applies to correspondent binding updates as well as user data packets. FIG. 4A shows the structure of the data packet. The Basic IPv6 header 100 comes first. The existence of the IPv6 Hop-by-Hop Options extension header 102 is indicated, according to standard IPv6 (RFC 2460), by placing a zero in the IPv6 Next Header field of the Basic IPv6 header 100. The Hop-by-Hop Options extension header 102 then immediately follows the Basic IPv6 header 100. Finally, the payload 104—ie the upper layer header such as TCP or UDP and the data—follows the Hop-by-Hop Options extension header 102. FIG. 6B shows the structure of the Hop-by-Hop Options extension header 102. The Next Header and Hdr Ext Len fields of the Hop-by-Hop Options extension header 102 are omitted for clarity. The HAddr of the MN is included in a Type-Length-Value (TLV) encoded option in the Hop-by-Hop Options extension header 102. Thus, a suitable Options Type number (8-bits) 106 is used to identify the type of option (ie the specification of the HAddr of the MN for a packet sent to a GPRS CN) followed by the Option Data Length 108 (which depends on the length of the HAddr) followed by the Option Data itself—ie the HAddr 110.

In this embodiment, the GGSN is IPv6 enabled and examines the Hop-by-Hop extension header of any received IPv6 packet having such a header. Note that, the GGSN is an intermediate node and, according to the IPv6 specification (RFC 2460), the GGSN must examine Hop-by-Hop extension header. Conversely, note that, according to the IPv6 specification (RFC 2460), the GGSN must not examine any other IPv6 extension header since it is an intermediate node. Hence, the MIPv6 procedure whereby a MN may send its HAddr in an IPv6 Home Address Destination Option extension header when sending a correspondent binding update will not assist in solving the problem identified since it will not be visible to the GGSN.

Furthermore, the GGSN is modified to attempt to map the HAddr of the MN identified in a Hop-by-Hop extension header of a received IPv6 data packet to the TFT packet filters stored for PDP contexts associated with the IP address of the CN in the GPRS network, and, if a match is found, to transfer the data packets accordingly. The process followed by the GGSN is shown in FIG. 5. The process starts at step 120. At step 122, the GGSN receives a data packet for downlink to a particular EP address of a CN in the GPRS network At step 124, the GGSN examines the a Hop-by-Hop Options extension header of the received packet. At step 126, the GGSN checks the HAddr of the MN specified in the Hop-by-Hop Options extension header against the Source Address fields of TFTs of PDP contexts associated with the IP address of the CN. If it is determined, at step 128, that a match exists, the process continues to step 130 where the packet is transferred to the CN using the PDP context containing the matching TFT. The process then continues to step 132 and ends. However, if it is determined, at step 128, that no match exists, the process then continues to step 132 and ends.

The GGSN will also attempt to match the source address of the received data packet to the Source Address fields of TFTs of PDP contexts associated with the CN according to standard GGSN functionality. Thus, for example, using a combination of the standard and modified procedure, a data packet either having a source address matching the Source Address attribute OR having an IP address specified in a Hop-by-Hop Options Header matching the Source IP Address attribute—being the HAddr of the MN—will match at least those attributes of the TFT packet filter and will be routed to the GTP tunnel corresponding to the appropriate PDP context.

When the data packet reaches the CN, it is recognised by the CN, despite having the CoA of the MN as its source address, because it has an IPv6 Hop-by-Hop Options extension header specifying the HAddr. It may also have a Home Address Destination Option extension header specifying the HAddr which will also be visible to the CN.

Second Embodiment

Figure 6:
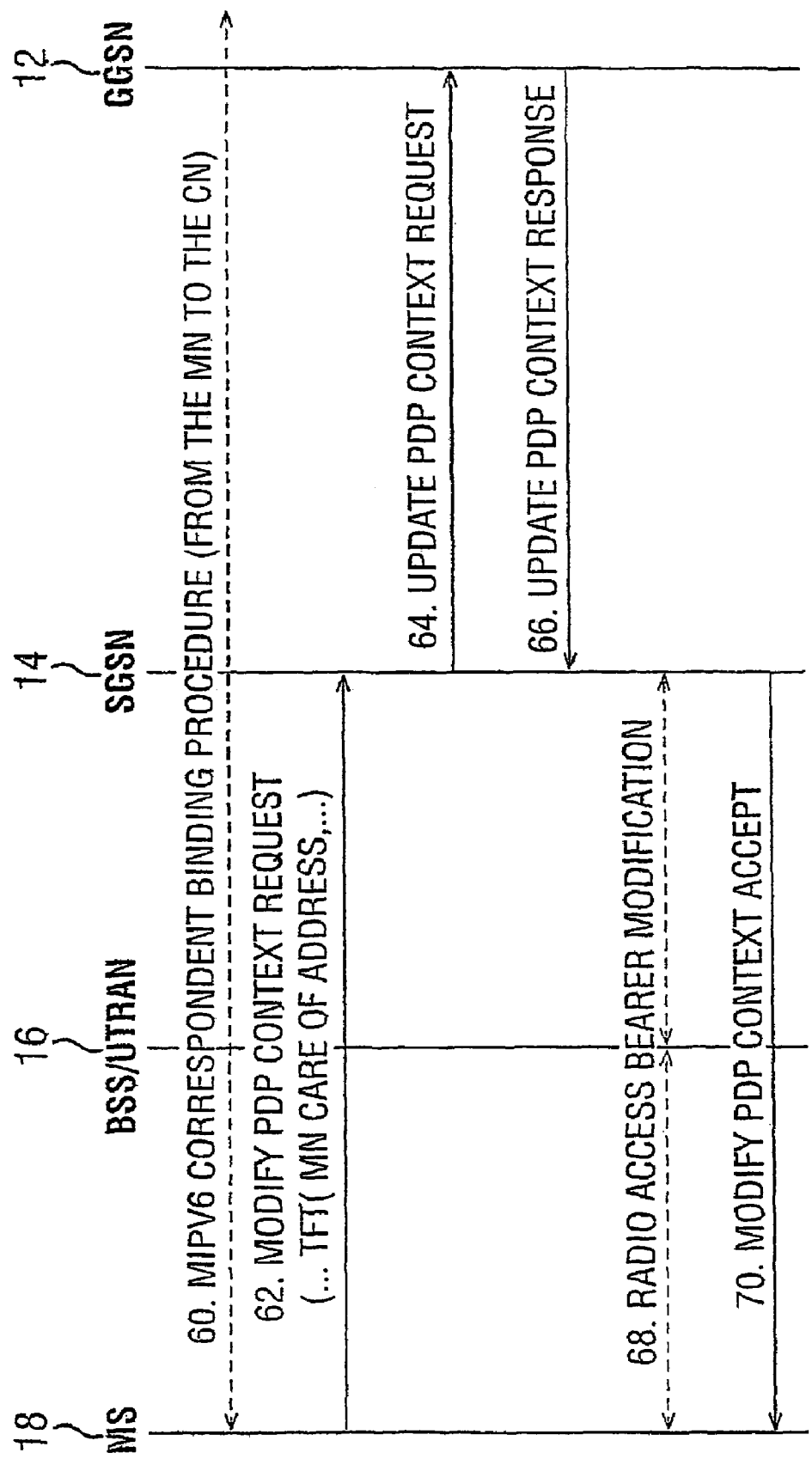
FIG. 6 is a message flow diagram, showing a PDP context modification procedure in a GPRS network enabling a GGSN to match packets from MNs away from home for downlink to a CN to the appropriate tunnel of the PDP context, according to the second, third and fifth embodiments of the present invention.

According to the second embodiment, which is a variant of the first embodiment described above, the MN only includes its HAddr in a Hop-by-Hop Options extension header of the signalling IPv6 packet it sends to the CN for correspondent binding updates. Thus, as described above, the correspondent binding update will be able to reach the CN. Upon receiving the correspondent binding update, the CN will then know the CoA of the MN and will then be able to create or modify a PDP context so that the GGSN may route subsequent data packets sent from the MN at its CoA without need for the use of Hop-by-Hop Options extension headers. This occurs as follows:

The CN may modify the activated PDP context (used for a communication session with the MN) to include, in a TFT associated with the PDP context, the MN's CoA—ie an IPv4 or IPv6 address—using the MS-Initiated PDP Context Modification Procedure, described in 3G TS 23.06 Clause 9.2.3 and incorporated herein by reference. FIG. 6 shows the PDP context modification procedure. At step 60, the MN (not shown) performs the MIP correspondent binding update procedure with the CN 18 using a Hop-by-Hop Options extension header as described above in the first embodiment. Assuming this is successful, at step 62, the CN send a Modify PDP Context Request to its SGSN 14. The Modify PDP Context Request message contains an instruction to add or modify a TFT associated with the PDP context to include the MN's CoA. Note that the CN may optionally also send an instruction to modify the QoS profile in the Modify PDP Context Request message. At step 64, SGSN 14 sends an Update PDP Context Request message to GGSN 12 including the instruction to add or modify the TFT as above. GGSN 12 checks the instruction (for example to see if the attributes in the packet filter of the TFT form a valid combination) and if acceptable, stores or modifies the TFT for the PDP context accordingly. Then, at step 66, GGSN 12 sends an Update PDP Context Response message to SGSN 14 indicating success. At step 68, radio access bearer modification may be performed (for example in a 3G GPRS network in Iu mode where the QoS profile of the PDP context has changed). At step 70, SGSN 14 sends a Modify PDP Context Accept message to the CN to confirm the successful modification of the PDP context (i.e. the TFT).

In one alternate version of the second embodiment, a modified TFT packet filter is used in which the list of possible IPv4 or IPv6 packet header attributes that may be included in packet filter is augmented as follows:

Source Address and Subnet Mask.
Care Of Address.
Protocol Number (IPv4) or Next Header (IPv6).
Destination Port Range.
Source Port Range.
IPSec Security Parameter Index (SPI).
Type of Service (TOS) (IPv4) or Traffic class (IPv6) and Mask.
Flow Label (IPv6).

where the Care Of Address is the IPv4 or IPv6 address of the MN in its FN.

Thus, for a PDP context, TFT packet filters stored at the CN, and GGSN may include the CoA of the MN in a specially identified field. The behaviour of the Care Of Address attribute, in terms of the validity of combination with other attributes, is the same as the behaviour of the Source Address attribute (see 3G TS 23.060 Clause 15.3.2). However, a TFT may comprise a packet filter having either of the Source Address and Care Of Address attributes singly or both the Source Address and Care Of Address attributes in combination. In the case in which both attributes are specified in a single TFT packet filter, they are treated as being alternatives—ie they are combined using the logical operator OR. Thus, a data packet either having a source address matching the Source Address attribute OR having a source address matching the Care Of Address attribute will match at least those attributes of the TFT packet filter. The functionality of the GGSN is modified to perform matching of incoming data packets for downlink to a MS using the modified TFT packet filters. Note that the same effect is achieved by including two packet filters in a TFT—one with the Source Address attribute defined and the other with the Care Of Address attribute defined.

The modified process followed by a GGSN according to this first version of the second embodiment is shown in the flow diagram of FIG. 7. The process starts at step 80. At step 82, the GGSN receives a data packet for downlink to a particular CN having an IP address in the GPRS network. At step 84, the GGSN checks the source address of the data packet against the Source Address fields of TFTs of PDP contexts associated with the IP address of the CN. If it is determined, at step 86, that a match exists, the process continues to step 88 where the packet is transferred to the CN using the PDP context containing the matching TFT. The process then continues to step 96 and ends. This corresponds to the conventional operation of a GGSN. However, if it is determined, at step 86, that no match exists, the process continues to step 90 where the GGSN checks the source address of the data packet against the augmented Care of Address fields of TFTs of PDP contexts associated with the IP address of the CN. If it is determined, at step 92, that a match exists, the process continues to step 94 where the packet is transferred to the CN using the PDP context containing the matching TFT. The process then continues to step 96 and ends. However, if it is determined, at step 92, that no match exists, the process then continues to step 96 and ends. Note that failure to match the source address of the data packet to a TFT may result in the data packet being dropped, or, alternatively, transferred to the CN using a PDP context with no associated TFT, if one exists.

Figure 4B:
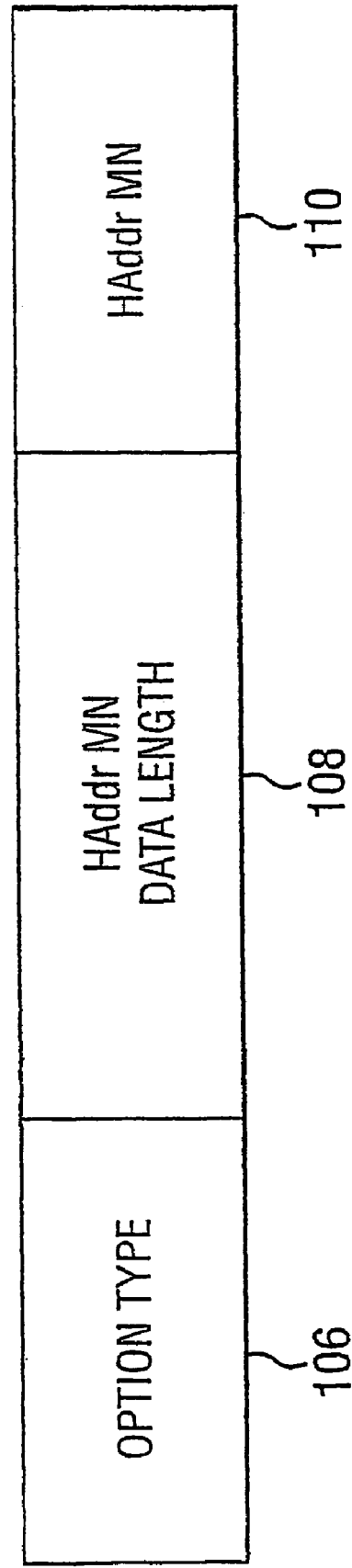

Alternatively, in a second version of the second embodiment, the standard TFT packet filter attributes are used, and the MS-Initiated PDP Context Modification Procedure described above with reference to FIG. 4 is used to add a new or modify an existing TFT to add a new packet filter including the MN's Care Of Address in the standard Source Address attribute. This new packet filter would be in addition to any existing packet filter for the TFT. Alternatively, the packet filter may replace or modify an existing packet filter.

Thus, a PDP context activated for a communication session with a MN may be modified to have an associated TFT with 1) one packet filter having both the MN's HAddr and CoA (using the augmented attribute list) or alternatively, 2) two packet filters—one having the MN's HAddr and the other the MN's CoA (using either the augmented or standard attribute list).

It will also be apparent that a PDP context may be activated together with an associated TFT packet filter including the MN's CoA using the MS-Initiated PDP Context Activation Procedure, described in 3G TS 23.060 Clause 9.2.2 incorporated herein by reference. Thus, a new PDP context may be activated for a communication session with the MN and, in the activation procedure, a TFT may be associated with the PDP context having either: 1) one packet filter having both the MN's HAddr and MN's CoA (using the augmented attribute list) or, alternatively, 2) two packet filters—one having the MN's HAddr and the other the MN's CoA (using either the augmented or standard attribute list).

In this way, after the initial correspondent binding update, packets sent by the MN while away from home may be filtered by the GGSN to the appropriate PDP context of the CN, without need for continued use of Hop-by-Hop Options extension headers and without the processing overheads that such continued use entails.

In variants of the first and second embodiments, the MN is modified to selectively include its HAddr in an IPv6 Hop-by-Hop Options extension header of the user data packet or correspondent binding update packet it sends to the CN when it (the MN) is away from home. The inclusion is only performed when the MN detects that the CN is being provided service in a GPRS network. Thus, the processing overheads of a) the MN including a Hop-by-Hop Options extension header in the tunnelled data packet, and b) the intermediate nodes on the route towards the GGSN examining the Hop-by-Hop Options extension header are eliminated where they are not necessary.

Third Embodiment

According to a third embodiment of the present invention, the MN must always include its HAddr when sending a correspondent binding update to the CN, preferably using a MIP Home Address Destination Option (described in the MIPv6 IETF Draft at Clause 6.3, incorporated herein by reference). Also, a PDP context with no associated TFT is always established in the GPRS network using the PDP Context Activation Procedure (described in 3G TS 23.060 Clause 9.2.2, incorporated herein by reference). On receipt of the correspondent binding update data packet from the MN, the GGSN will attempt to match the packet to those PDP contexts with associated TFTs in the normal way, but when this fails because the source address is the new CoA or CoCoA of the MN, the packet will be routed to the CN using the PDP context with no associated TFT. When the CN receives the correspondent binding update, it examines the Home Address Destination Option Header, or other header, containing the HAddr of the MN which it recognises. The MN may then associate the packet with the existing communication session with the MN. The CN may then modify the existing PDP context, or create a new PDP context, to include the CoA of the MN as described above in relation to the second embodiment.

In a variant of the third embodiment, the MN is modified to selectively include its HAddr in a Home Address Destination Option Header, or other header, of a correspondent binding update packet it sends to the CN when it (the MN) is away from home. The inclusion is only performed when the MN detects that the CN is being provided service in a GPRS network.

Fourth Embodiment

According to a fourth embodiment of the present invention, where the MN is IPv6 capable, the MN is modified to include its HAddr, preferably in an IPv6 Destination Option extension header, for all IPv6 data packets it sends to the CN whenever it is away from home. This applies to correspondent binding updates as well as user data packets. However, because an intermediate node will not in general be able to read this information, the address of the GGSN in the GPRS network is provided as the destination address of the IPv6 data packet, rather than the address of the CN itself. It will shortly be described below how the MN may be provided with the address of the GGSN if it doesn't already know it. Furthermore, the address of the CN is included in an IPv6 Routing Header Type 0 extension header of the data packet. This Routing Header enables an IPv6 packet to be routed through a plurality of nodes at various addresses starting off by being delivered to the destination address of the packet (in this case the GGSN) and then being forwarded in turn to each node corresponding to a list of further routing addresses contained in the Routing Header (in this case the IP address of the CN).

Figure 8A:
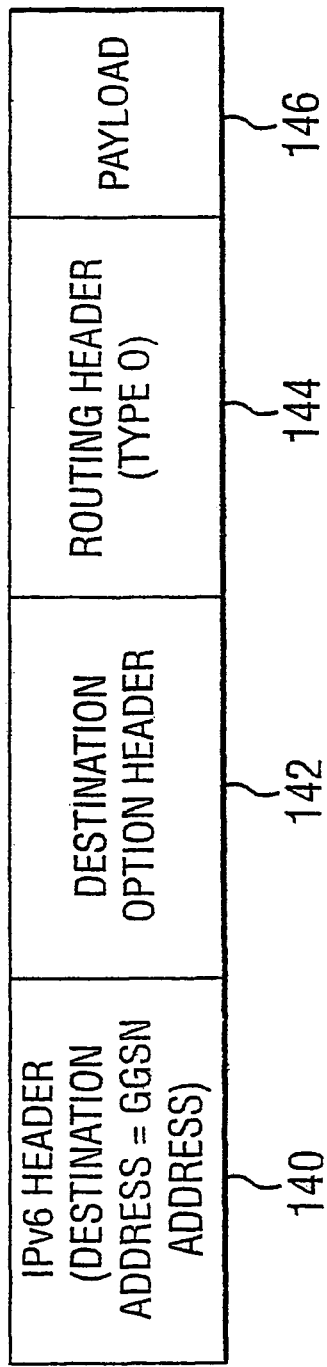
FIGS. 8A, 8B and 8C are block diagrams showing the modified structure of IPv6 data packets sent by the MN according to fourth and fifth embodiments of the present invention.

FIG. 8A shows the structure of data packets sent by the MN. The basic IPv6 header 140 comes first. The existence of the IPv6 Destination Option extension header 142 is indicated, according to standard IPv6 (RFC 2460), in the Next Header field of the basic IPv6 header 140. Note that the destination address in the basic IPv6 header 140 is the address of the GGSN. The IPv6 Destination Option extension header 142 then immediately follows the basic IPv6 header 140. The existence of the IPv6 Routing Header (Type 0) 144 is indicated, according to standard IPv6 (RFC 2460), in the IPv6 Next Header field of the Destination Option extension header 142. The Routing Header (Type 0) 144 then immediately follows the Destination Option extension header 142. Finally, the payload 146—ie the upper layer header such as TCP or UDP and the data—follows the Routing Header (Type 0) 144.

Figure 8B:
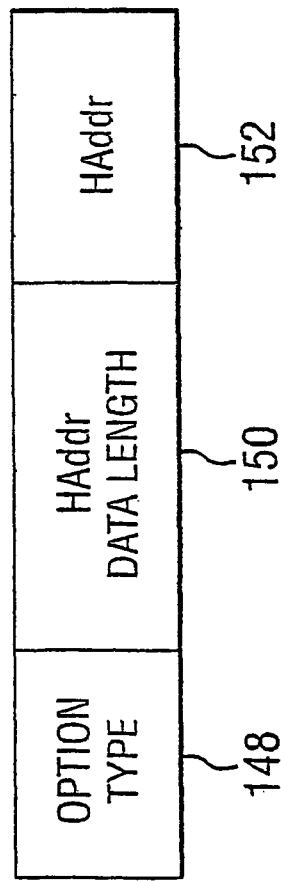

FIG. 8B shows the structure of the IPv6 Destination Option extension header 142 itself. The format of this extension header is described in RFC 2460. The Next Header and Hdr Ext Len fields of the Destination Option extension header 142 are omitted for clarity. The HAddr of the MN is included in a Type-Length-Value (TLV) encoded option in the Destination Option extension header 142. Thus, the Options Type number 148 is used to identify the type of option followed by the Option Data Length 150 (which depends on the length of the address of the HAddr) followed by the Option Data itself—ie the HAddr 152.

Figure 8C:
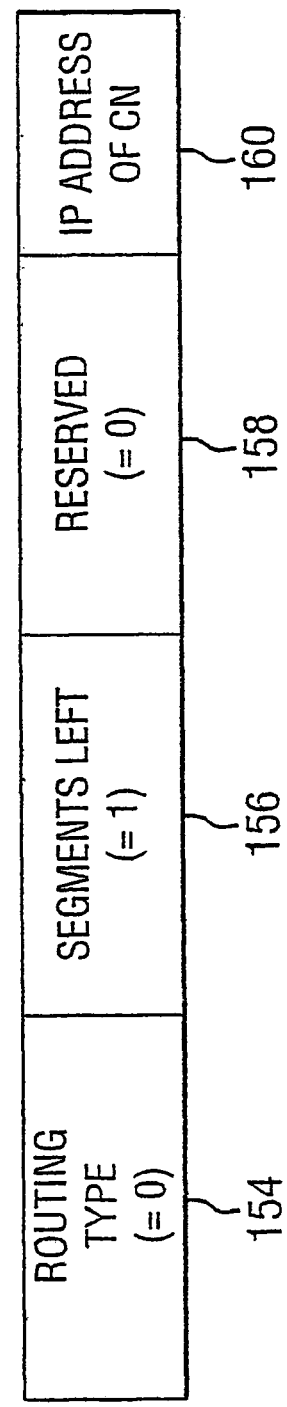

FIG. 8C shows the structure of the Routing Header (Type 0) extension header 144 itself. The format of this extension header is described in the RFC 2460. The Next Header and Hdr Ext Len fields of the Routing Header (Type 0) extension header 144 are omitted for clarity. The Routing Type field 154 (ie 0 in this case) comes next, followed by the Segments Left field, which is initially set to 1 by the MN (this counts down to 0 as the data packet is forwarded to from the GGSN to the CN). Then follows a reserved field (set to 0) and then the IP address of the CN itself.

In this embodiment, the GGSN is IPv6-enabled and examines the Destinations Option header of any received IPv6 packet having such a header. Note that by providing the address of the GGSN as the destination address, the correspondent binding update packet will first be delivered to the GGSN which will be a destination node (rather than an intermediate node as in previous embodiments) and therefore able to read the Destinations Option header. Furthermore, the GGSN is modified to attempt to map the HAddr of the MN, identified in the Destinations Option header, to the TFT packet filters stored for PDP contexts associated with the address of the CN, which is included in the IPv6 Routing Header Type 0 Option. If a match is found, the GGSN transfers the data packets to the GTP tunnel associated with the appropriate PDP context of the address of the CN accordingly.

The process followed by the GGSN is shown in FIG. 9. The process starts at step 170. At step 172, the GGSN receives a data packet with an IPv6 Routing Header Type 0 indicating that the packet is for downlink to a particular CN having a IP address in the GPRS network. At step 174, the GGSN examines the Destinations Option extension header of the received packet. At step 176, the GGSN checks the HAddr of the MN specified in the Destinations Option extension header against the Source Address fields of TFTs of PDP contexts associated with the IP address of the CN. If it is determined, at step 178, that a match exists, the process continues to step 180 where the packet is transferred to the CN using the PDP context containing the matching TFT. The process then continues to step 182 and ends. However, if it is determined, at step 178, that no match exists, the process then continues to step 182 and ends.

The GGSN will also attempt to match the source address of the received data packet to the Source Address fields of TFTs of PDP contexts associated with the MN according to standard GGSN functionality. Thus, a data packet either having a source address matching the Source Address attribute OR having an IP address specified in a Destinations Option Header matching the Source IP Address attribute—being the HAddr address of the MN—will match at least those attributes of the TFT packet filter and will be routed to the GTP tunnel corresponding to the appropriate PDP context.

However, as indicated above, this procedure requires the MN to know or be provided with the address of the GGSN in the GPRS network. This may be achieved as follows. Preferably immediately after commencing a communication session with the MN, but possibly later, the CN may send a message or, preferably, instruct the GGSN itself to send a message to the MN containing the address of the GGSN. The CN may instruct its GGSN to send such a packet using PDP Configuration Options which are described in 3G TS 23.060 Clause 9.2.2, incorporated herein by reference. PDP Configuration Options contain optional PDP parameters that the GGSN may transfer to a MS. The sending of these optional PDP parameters may be requested by the CN in the Activate PDP Context Request message for the communication session established with the MN.

Fifth Embodiment

According to a fifth embodiment, which is a variant of the fourth embodiment described above, the MN only follows the modified procedure described in the fourth embodiment for correspondent binding update packets. Thus, the MN includes its HAddr, preferably in an IP Destination Option extension header, addresses the data packet to the GGSN, and includes the CN address in a Routing Header Type 0 Option only for correspondent binding update packets. Thus, as described above, the correspondent binding update will be able to reach the CN. Upon receiving the correspondent binding update, the CN will then know the CoA of the MN and will then be able to create or modify a PDP context so that the GGSN may route subsequent data packets sent from the MN at its CoA without need for the use of procedure described in the fourth embodiment. This occurs as described above in relation to the second embodiment.

In variants of the fourth and fifth embodiments, the MN is modified to selectively use the procedures described in those embodiment only when the MN detects that the CN is being provided service in a GPRS network.

It will be appreciated that the embodiments described above may be implemented using data associated with the data packets other the HAddr of the MN. Any data capable of uniquely identifying the MN to the CN or GGSN and known to the CN or GGSN prior to the MN being provided with a CoA or CoCoA (eg known from the communication session with the MN) will do. Furthermore, it will be apparent that further data, may be included in the Hop-by-Hop Options extension header or Destinations Option extension header, and in the modified or newly created TFT to further specify the MN to the CN or GGSN and to provide further filtering of received data packets by the GGSN or CN.

It will be apparent that the present invention applies to networks other than GPRS networks. In general, it applies to any network in which a gateway node may need to select one from a plurality of channels (whether PDP contexts or otherwise) for transferring downlink packets towards a node, whether a user or network-side node.

The present invention also applies to the situations where gateway nodes need to perform general packet filtering and/or firewall functions for protection against unauthorised service/bearer access and/or service attacks.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of enabling a gateway node of a first packet-switched data network to select a first channel for transferring a data packet to a destination packet data protocol address of a correspondent node provided service in the first network, wherein the gateway node is configured to select the first channel from a plurality of channels configured to transfer data packets to the destination packet data protocol address of the correspondent node, wherein the data packet has been sent from a mobile node of a second packet-switched data network external to the first network, wherein the mobile node has been in a communication session with the correspondent node while provided service in a third packet-switched data network different to the second network, the method comprising:

a) the mobile node associating, with the data packet, a first packet data protocol address which it used in the communication session with the correspondent node;

b) the gateway node selecting the first channel by matching the first packet data protocol address associated with the data packet received by the gateway node to a first data packet filter associated with the first channel; and c) transferring the data packet through the first channel, and, in response to receipt of the data packet, the correspondent node arranging for inclusion of the current packet data protocol address of the mobile node in the second network in the first data packet filter.

2. The method according to claim 1, wherein the data packet is an Internet Protocol version 6 (IPv6) data packet and the first packet data protocol address of the mobile node is associated with the data packet by being included in a Hop-by-Hop extension header of the data packet.

3. The method according to claim 1, wherein the first packet data protocol address of the mobile node is associated with the data packet by being included in a Destination Option extension header of the data packet.

4. The method according to claim 3, wherein the mobile node addresses the data packet to the packet data protocol address of the gateway node, and wherein the destination packet data protocol address of the correspondent node is associated with the data packet.

5. The method according to claim 4, wherein the data packet is an Internet Protocol version 6 (IPv6) data packet and the destination packet data protocol address of the correspondent node is associated with the data packet sent to the gateway node by being included in a Routing Header Type 0 Option header of the data packet.

6. The method according to claim 1, wherein the first packet filter is created, prior to step c), so as to enable the gateway node to select the first channel for transferring data packets sent by the mobile node while involved in the communication session, and wherein step c) comprises modifying the first data packet filter to include the current packet data protocol address of the mobile node.

7. The method according to claim 6, wherein the current packet data protocol address of the mobile node replaces the first packet data protocol address in the first data packet filter.

8. The method according to claim 6, wherein the current packet data protocol address is added to the first data packet filter which also comprises the first packet data protocol address of the mobile node.

9. The method according to claim 1, wherein, the first packet filter is newly created in step c).

10. The method according to claim 1 wherein mobility of the mobile node between networks or subnetworks is supported using the Mobile Internet Protocol (MIP) standards a current packet data protocol address of mobile node is the Care Of Address (CoA, CoCoA) of the mobile node, and the first packet data protocol address of the mobile node is the Home Address (HAddr) of the mobile node.

11. The method according to claim 10, wherein the data packet is a MIP correspondent binding update sent from the mobile node to the correspondent node.

12. The method according to claim 1, wherein the first network conforms to the General Packet Radio Service (GPRS) standards and the plurality of channels correspond to a plurality of packet data protocol contexts in the first network.

13. A gateway node of a first packet-switched data network arranged to select a first channel configured to transfer a data packet to a destination packet data protocol address of a correspondent node provided service in the first network, from a plurality of channels each configured to transfer data packets to the destination packet data protocol address of the correspondent node, wherein the data packet has been sent from a mobile node of a second packet-switched data network external to the first network, wherein the mobile node has been in a communication session with the correspondent node while provided service in a third packet-switched data network different to the second network, wherein the gateway node selects the first channel by matching a first packet data protocol address, associated with the data packet received by the gateway node, to a first data packet filter associated with the first channel, wherein the first packet data protocol address has been used by the mobile node in the communication session with the correspondent node, and wherein, after having sent the data packet to the correspondent node, and in response to receipt of a subsequent instruction from the correspondent node, the gateway node includes, in the first data packet filter, the current packet data protocol address of the mobile node in the second network.

14. The gateway node according to claim 13, wherein the data packet is an Internet Protocol version 6 (IPv6) data packet and the first packet data protocol address of the mobile node is associated with the data packet by being included in a Hop-by-Hop extension header of the data packet.

15. The gateway node according to claim 13, wherein the first packet data protocol address of the mobile node is associated with the data packet by being included in a Destination Option extension header of the data packet.

16. The gateway node according to claim 15, wherein the data packet is addressed to the packet data protocol address of the gateway node, and the destination packet data protocol address of the correspondent node is associated with the data packet.

17. The gateway node according to claim 16, wherein the data packet is an Internet Protocol version 6 (IPv6) data packet and the destination packet data protocol address of the correspondent node is associated with the data packet sent to the gateway node by being included in a Routing Header Type 0 Option header of the data packet.

18. The gateway node according to claim 13, wherein the first packet filter was created to enable the gateway node to select the first channel for transferring data packets sent by the mobile node while involved in the communication session, and the first data packet filter is modified to include the current packet data protocol address of the mobile node.

19. The gateway node according to claim 18, wherein the current packet data protocol address of the mobile node replaces the first packet data protocol address in the first data packet filter.

20. The gateway node according to claim 18, wherein the current packet data protocol address is added to the first data packet filter which also comprises the first packet data protocol address of the mobile node.

21. The gateway node according to claim 13, wherein the first packet filter is newly created.

22. The gateway node according to claim 13, wherein mobility of the mobile node between networks or subnetworks is supported using the Mobile Internet Protocol (MIP) standards, the current packet data protocol address of mobile node is the Care Of Address (CoA, CoCoA) of the mobile node, and the first packet data protocol address of the mobile node is the Home Address (HAaddr) of the mobile node.

23. The gateway node according to claim 22, wherein the data packet is a MIP correspondent binding update sent from the mobile node to the correspondent node.

24. The gateway node according to claim 13, wherein the first network conforms to the General Packet Radio Service (GPRS) standards and the plurality of channels correspond to a plurality of packet data protocol contexts in the first network.

* * * * *